Dec. 24, 1963  J. R. WHITACRE  3,114,970
SEALING INTEGRAL TANKS BY GAS PLATING
Filed Jan. 19, 1959  2 Sheets-Sheet 1
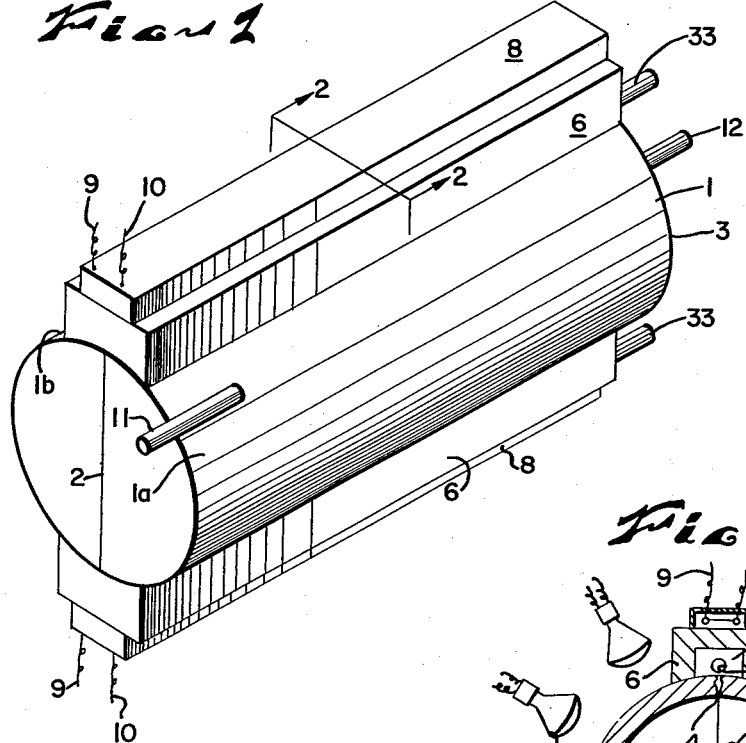
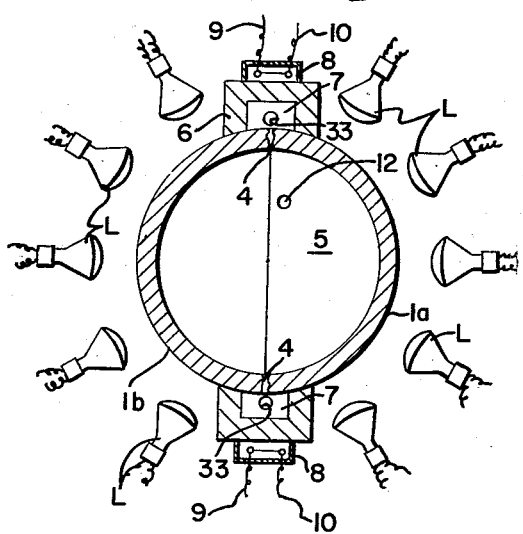
INVENTOR.
JOHN R. WHITACRE
BY
ATTORNEYS

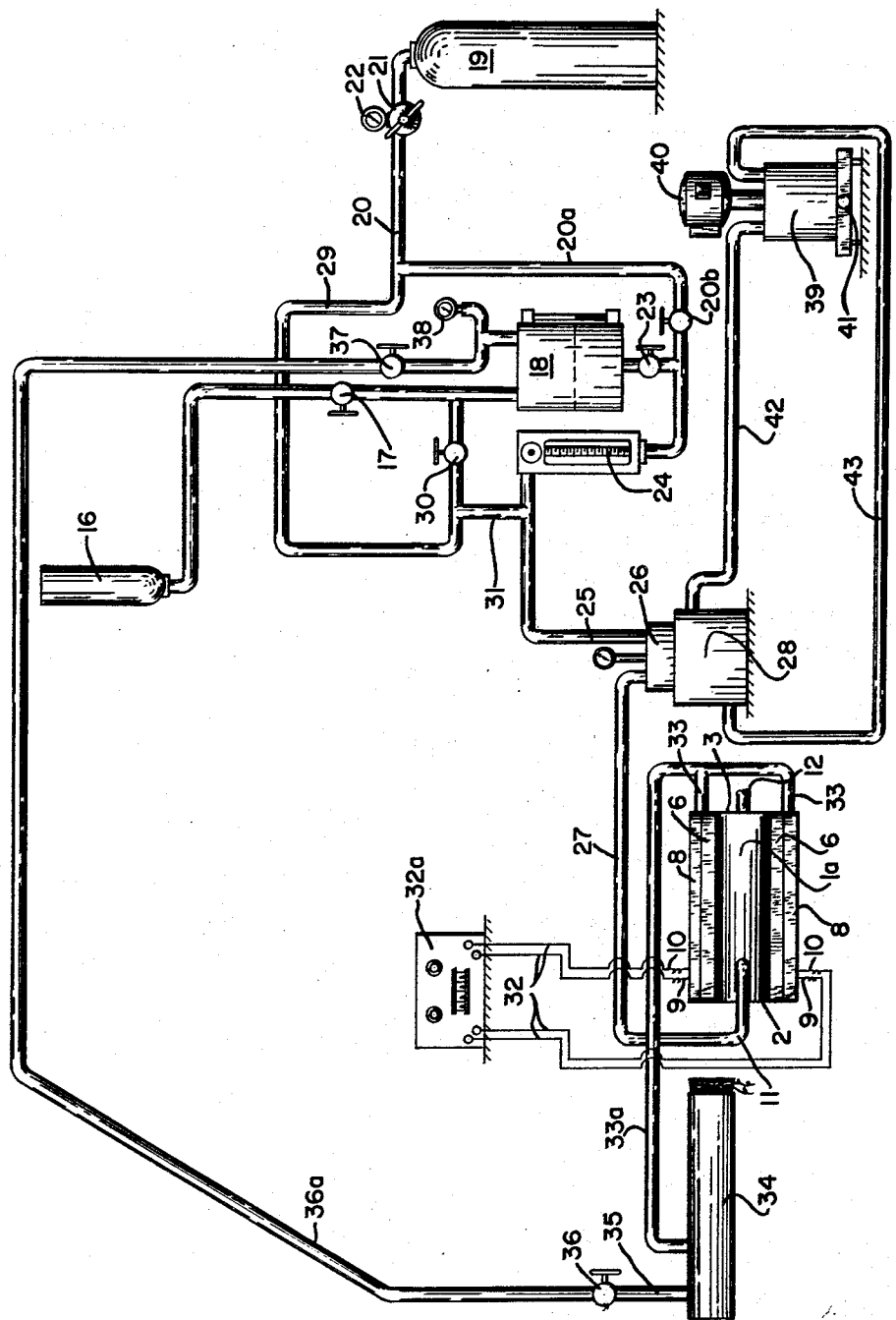

United States Patent Office 3,114,970
Patented Dec. 24, 1963

3,114,970
SEALING INTEGRAL TANKS BY GAS PLATING
John R. Whitacre, Dayton, Ohio, assignor, by mesne assignments, to Union Carbide Corporation, New York, N.Y., a corporation of New York
Filed Jan. 19, 1959, Ser. No. 787,572
3 Claims. (Cl. 29—527)

This invention relates to the production of completely sealed tanks and is particularly directed to the overcoming of defects in welded tanks.

Tanks such as those for rocket fuels, gasoline, and the like, are usually formed of two semi-cylindrical parts welded together lengthwise and provided with end plates which may also be welded to complete the tank. With many materials, and particularly stainless steel, the welds formed tend to be porous; this results in a large percentage of rejects.

A primary object of this invention is the provision of a novel method for sealing completely the weld area of tanks while yet attaining a seal which is resistant to the conditions for which the tank itself is designed.

An important object of the invention is the provision of novel apparatus for the sealing of tanks and particularly welded tanks.

Another object of the invention is the provision of a tank having a novel weldment structure.

In the practice of the invention the weld area of the tank is evacuated of oxidizing gases, subjected to heat to raise the temperature of the weld to the decomposition temperature of a heat decomposable metal bearing gas, and then the weld is exposed to a flow of such a gas. The gas decomposition is an incomplete reaction and accordingly some of the gas passes through the pores of the weld without decomposing to deposit metal; some of the gas does however decompose to deposit metal on the weld and to thereby fill the pores of the weld.

That portion of the metal bearing gas which does not decompose is passed to exhaust, and destroyed, or recovered as desired.

The metal deposited on the weld bonds well; for example, nickel deposited from nickel carbonyl on stainless steel, when subjected to a temperature cycling from $-55°$ C. to $340°$ C. ($-70°$ to $650°$ F.), maintains its integrity. The metal deposit is crystalline and the growth of the deposit tends to be at right angles to the gas flow or pores of the weld. Thus in effect the pores of the weld are formed both by filling and by bridging with metal from the gas.

The tank is itself maintained heated, during the metallizing operation, to a temperature sufficient such that the metallizing gas will remain volatile; this in the case of normally liquid metal bearing compounds avoids condensation of the compound within the tank. The weld areas are preferably locally heated from without the tank and the metallizing gas is passed through the weld from the interior to the exterior. The gas is supplied to the tank through any suitable opening such as the usual tank filling opening.

The nature of the pores in the weld generally results in a buildup of gas pressure within the tank such that the gas is forced through the weld pores. In many instances, the pore size of such welds is such that liquids such as water would not, at atmospheric pressure, leak; however, with tanks of large size wherein the liquid may exert considerable pressure, and with many liquids such as fuels having a greater capillary ability than water, it is desirable to insure that a solid non-porous weldment is achieved.

The invention will be more fully understood by reference to the following detailed description and accompanying drawings wherein:

FIGURE 1 is a perspective view of a tank provided with apparatus for effecting the metallizing operation;

FIGURE 2 is a sectional view taken on line 2—2 of FIGURE 1 and in addition illustrating means for heating the tank generally;

FIGURE 3 is a fragmentary and sectional view somewhat enlarged of a portion of the structure of FIGURE 2; and FIGURE 4 is a schematic view illustrating apparatus useful in the practice of the invention.

Referring now to the drawings more in detail the numeral 1 designates a tank composed of two semi-cylindrical sections 1a and 1b and closed by end plates 2, 3. While the end plates may themselves be welded to the tank structure, or may themselves be formed as semi-circles and welded together, the present description is confined to describing the operation for the metallizing of the longitudinal welds of the tank. This is for the sake of clarity since, obviously, other weld areas or other shapes of tanks may similarly be subjected to metallizing operations.

The numeral 4 designates the weld area of the tank, one weld area being shown in the upper portion of FIGURE 2 and the second weld area being shown in the lower portion of FIGURE 2.

The closed tank (FIGURE 2) defines an interior chamber 5. For the sake of simplicity reference will be made to only one weld structure since both (FIGURE 2) are identical.

Surmounting the weld area 4 in FIGURE 2 is a longitudinally extending manifold 6, the internal cavity of which is indicated at 7. Secured on the manifold 6 in any suitable manner is an electric heater 8 having electrical leads 9, 10. The tank has an inlet 11 (FIGURE 4) and an outlet 12. In the practice of the invention the outlet 12 is normally closed off by any suitable means and the inlet 11 is used for the entry of the metallizing gases. The metallizing operation to be described results in the deposit of metal, not only in the weld, but a complete bridging over the weld on the interior of the tank as indicated at 14 (FIGURE 3).

Referring now to FIGURE 4 wherein production metallizing apparatus is illustrated, the numeral 16 designates a source of liquid nickel carbonyl, which is flowed through a supply charging valve 17 to a nickel carbonyl container 18 provided with a sight level gauge as indicated.

A supply of carbon dioxide gas is provided at 19 and flows through conduit 20 when valve 21 is opened. The numeral 22 designates a pressure gauge. Valve 23 when opened provides a flow of liquid carbonyl with the flow of the carbon dioxide through conduit 31. This flow is combined after the liquid carbonyl passes through flow meter 24 into conduit 25 to a vaporizer 26. The outlet conduit 27 of the vaporizer is connected to the inlet 11 of the tank 1.

Surrounding the vaporizer 26 is a heating jacket 28, to which further reference will be made hereinafter.

For the purpose of assisting the flow of the liquid carbonyl, carbon dioxide may be passed through conduit 29 and valve 30 to the liquid carbonyl chamber 18 to exert a pressure on the liquid carbonyl in the chamber. Control of the carbon dioxide flow through line 29 is effected by valve 21.

Valve 20b in line 20a is necessary to flush flowmeter without purging carbonyl chamber 18.

This latter arrangement, that is, the flow through valve 20b, is useful in providing for purging of the vaporizer, and the tank 1, and the lines pertinent thereto prior to the start of a metallizing operation. This is desirable in order to purge all air and other contaminating gases from the system, and particularly to tank 1.

Leads 32 extend from a control box 32a to each side of the heater elements 8 and are connected to the elements through the leads 9, 10. Each manifold is provided with an outlet 33 which is connected through a common conduit 33a to the fume burner indicated at 34. While some decomposition of the carbonyl will occur in the manifold the fume burner is desirable to inhibit against carbonyl escape to the atmosphere.

Connected to the fume burner also is a conduit 35 which communicates through valve 36 and conduit 36a with a valve 37 controlling gas flow of container 18; the numeral 38 indicates a pressure gauge for indicating gas pressure in container 18.

The vaporizer jacket 28 is heated with hot water and for this purpose a hot water receptacle 39 and pump 40 are provided, the heater for the hot water being indicated at 41. The hot water flows through conduit 42 and returns through conduit 43.

In the practice of the invention with valve 37 open and valve 23 closed liquid carbonyl is flowed from the source 16 to container 18; gases including vapors of carbonyl escape through valve 37 to the fume burner, thus preventing gaseous pressure build-up in container 18 and accordingly the container may be well filled.

The system is flushed with carbon dioxide before opening valve 23. This flushing is effected by opening valves 21 and 20b (with valve 30 also closed) and passing the carbon dioxide through the components to the fume burner and thereby to the atmosphere.

With the carbon dioxide flowing and valves 30 and 23 opened the carbonyl flows with the carbon dioxide to the vaporizer; valves 37 and 36 are opened while storage chamber 18 is charged with nickel carbonyl.

The carbonyl is vaporized at 26 and flows with the carbon dioxide to inlet 11.

As shown in FIGURE 4 the manifold 6 is on the outer side or the exterior of the tank 1. Consequently a metallizing gas introduced into the chamber of the tank at 11 will tend to penetrate the weld at 4 (FIGURE 2), passing into the manifold, and then to the fume burner. As the metallizing gas passes through the weld 4, with the weld heated to the decomposition temperature of the metal bearing gas, metal will be deposited in the pores and generally will extend transversely to the walls forming the pores. Not all of the gas decomposes and accordingly it is desirable to utilize the fume burner to destroy the carbonyl.

In the practice of the invention the flow of the carrier gas, which in the present instance is carbon dioxide, is usually considerably in excess of the nickel carbonyl flow. For example, when the carbonyl is fed at the rate of about 0.5 cc. of liquid per minute to the vaporizer, the carbon dioxide flow is suitably about 0.5 liter per minute. Under these conditions the local heating of the weld is preferably such as to raise the temperature of the weld itself to about 370° F. to 380° F.

Heat lamps L (FIGURE 2) may be utilized to maintain the temperature of the tank sufficient such that the metallizing gas will not tend to condense. In the case of nickel carbonyl a tank temperature of 75 to 80° F. is suitable. Under this condition substantially no nickel carbonyl deposit will take place other than in the weld areas.

The time of plating varies of course with the tank size and the extent of porosity of the weldment. Where a long plating time is required the tank may tend to become heated overall, to the decomposition temperature, by conduction—as this tends to result in carbonyl loss the tank may be locally cooled to within the temperature range sufficient to maintain the metallizing gas volatile and consequently heating of the weld area, or plating may be intermittent accompanied by tank cooling as necessary.

The water jacket temperature operating under the foregoing conditions is suitably 120 to 130° F. Under these conditions nickel deposited in the weld adheres well, fills the weld and bridges the pores, rendering the tank 1 completely sealed.

Tests of deposited metal on stainless steel have indicated good adhesion even under rigid cycling tests. For example, in one instance after a temperature cycles of $-55$ to $340°$ C. ($-70$ to $650°$ F.) the adhesion under 50 pounds per square inch was found to be entirely satisfactory.

In connection with the deposition of metal from metalizing gases and particularly nickel carbonyl on the stainless steel, temperatures of the stainless steel opening to be bridged have been between 300 and 380° F. Flow rates of the liquid nickel carbonyl have been varied from about 0.5 cc. per minute of liquid carbonyl to 2 cc. per minute; while limits employed for carbon dioxide flow have varied from about 0.25 liter per minute to 1 liter per minute.

Plating time in such instances has varied from 15 minutes to about 35 minutes. For example, a uniform adherent deposit has been achieved in 15 minutes with a liquid carbonyl flow of 2 cc. per minute at a temperature of the stainless steel of 350° F. Also in a time of 35 minutes at a plating temperature of 350° F. a deposit has been achieved with a liquid carbonyl flow of 1½ cc. per minute. At a plating temperature of 350° F. and a liquid carbonyl flow of 0.5 cc. per minute with a carbon dioxide flow of 0.5 liter per minute, bridging occurs in about 10 minutes, but complete filling of the slot requires a somewhat longer time of about 10 minutes additional.

It will be understood that this invention is susceptible to modification in order to adapt it to different usages and conditions and accordingly, it is desired to comprehend such modifications within this invention as may fall within the scope of the appended claims.

What is claimed is:

1. The process of sealing pores in a welded tank structure having portions thereof retained together by a weld having pores therethrough, said process comprising the steps of introducing into the closed tank structure an atmosphere containing a thermally decomposable metal bearing gaseous compound, maintaining the temperature of the tank structure below the decomposition point of the metal bearing gaseous compound, building up a pressure of the gaseous compound within the tank to cause the gaseous compound to penetrate the pores of said weld, selectively heating the area of the weld to a temperature high enough to cause at least some thermal decomposition of the metal bearing gaseous compound whereby metal is deposited to fill and bridge the pores of said weld, and passing through the pores of the weld to the exterior of the tank undecomposed metal bearing gaseous compound and gaseous decomposition products.

2. The process of sealing pores in a welded tank structure having portions thereof retained together by a weld having pores therethrough, said process comprising the steps of closing a tank having a welded section to be sealed, introducing into said closed tank structure gaseous nickel carbonyl and an inert carrier gas, maintaining the temperature of said tank structure below the decomposition point of the carbonyl while locally heating the area of the porous weld to an extent sufficient to cause thermal decomposition of at least some of the nickel carbonyl and deposition of nickel metal in the pores of the weld, and passing through the pores of the weld to the exterior of the tank undecomposed gaseous nickel carbonyl and the gaseous products of the decomposition together with said carrier gas.

3. The process of sealing pores in a welded stainless steel tank structure having portions thereof welded together by a weld having pores therethrough, said process comprising the steps of heating nickel carbonyl and inert carrier gas to provide gaseous nickel carbonyl, flowing the resultant heated mixture of nickel carbonyl gas and carrier gas into said tank structure to produce a pressure of the gases in the tank structure which is above atmospheric, heating the tank structure to a temperature sufficient to maintain the nickel carbonyl gaseous but insufficient to decompose the metal carbonyl, locally heating the area of the weld to a temperature high enough to bring about thermal decomposition of at least some of said gaseous nickel carbonyl and deposition of metal in the pores of said weld, and conveying away undecomposed gaseous carbonyl together with the carrier and gaseous decomposition products, and continuing the flow of said gaseous metal and carrier gas into said tank and through the weld to completely seal the pores with nickel metal deposit.

References Cited in the file of this patent

UNITED STATES PATENTS

| | | |
|---|---|---|
| 1,441,484 | Conover | Jan. 9, 1923 |
| 1,680,276 | Andrus | Aug. 14, 1928 |
| 1,838,249 | Miller | Dec. 29, 1931 |
| 2,050,339 | Kidd | Aug. 11, 1936 |
| 2,130,829 | Dobke | Sept. 20, 1938 |
| 2,228,087 | Rose | Jan. 7, 1941 |
| 2,287,869 | Ehrman | June 30, 1942 |
| 2,342,357 | Brown | Feb. 22, 1944 |
| 2,449,655 | Keiffer | Sept. 21, 1948 |
| 2,580,976 | Toulmin | Jan. 1, 1952 |
| 2,654,946 | Rhodes | Oct. 13, 1953 |
| 2,667,432 | Nolte | Jan. 26, 1954 |
| 2,686,958 | Eber | Aug. 24, 1954 |
| 2,793,423 | Stumbock | May 28, 1957 |
| 2,934,820 | Novak | May 3, 1960 |